Feb. 14, 1956 O. K. NILSSEN 2,735,021

MAGNETIC BINARY DEVICE

Filed Dec. 24, 1954 2 Sheets-Sheet 1

INVENTOR.

Ole K. Nilssen

BY Morris A. Rabkin

ATTORNEY.

Feb. 14, 1956 O. K. NILSSEN 2,735,021

MAGNETIC BINARY DEVICE

Filed Dec. 24, 1954 2 Sheets-Sheet 2

INVENTOR.
Ole K. Nilssen
BY Morris L. Rabkin
ATTORNEY.

2,735,021

MAGNETIC BINARY DEVICE

Ole K. Nilssen, Collingswood, N. J., assignor to Radio Corporation of America, a corporation of Delaware Application December 24, 1954, Serial No. 477,525

14 Claims. (Cl. 307—88)

This invention relates to magnetic devices having a binary mode of operation and that may be employed as a bistable trigger circuit and binary counter.

Magnetic systems have been developed that employ magnetic cores made of material having a substantially rectangular hysteresis curve. These magnetic systems have the advantages of small size, relatively small power supply and relatively long life. Magnetic devices having a binary mode of operation may be employed as bistable trigger circuits and binary counters.

It is among the objects of this invention to provide:

A new and improved magnetic device having a binary mode of operation;

A simple and economical bistable device using magnetic elements as the dynamic circuit components;

An improved magnetic trigger circuit that is simple and reliable;

An improved binary counter that uses magnetic cores as the dynamic circuit components.

In accordance with this invention a magnetic trigger circuit includes a plurality of magnetic elements each of which has two remanent states of substantial saturation. Input windings are linked to the cores and connected to a source of voltage pulses. The input windings are so connected that the same energizing current flows through the windings. The number of turns in the input windings and the coercive forces of the elements are such that a smaller energizing current in a first one of the elements and a larger energizing current in a second one of the elements is necessary to produce magnetizing forces of magnitude sufficient to change the states of the respective elements. A first voltage pulse chaanges the first element from its initial state to the opposite state. During the change of state of the first element the energizing current in the input winding is insufficient to change the state of the second element. A second voltage pulse of the same polariy does not affect the state of the first element and does change the second element to its opposite state. Means are provided for applying magnetizing forces to both elements to restore them to their initial states when the second element is changed to the opposite state. A binary counter is provided by connecting a plurality of these devices in cascade.

The foregoing and other objects, the advantages and novel features of this invention, as well as the invention itself, both as to its organization and mode of operation, may be best understood from the following description when read in connection with the accompanying drawing, in which like reference numerals refer to like parts, and in which.

Figure 1:
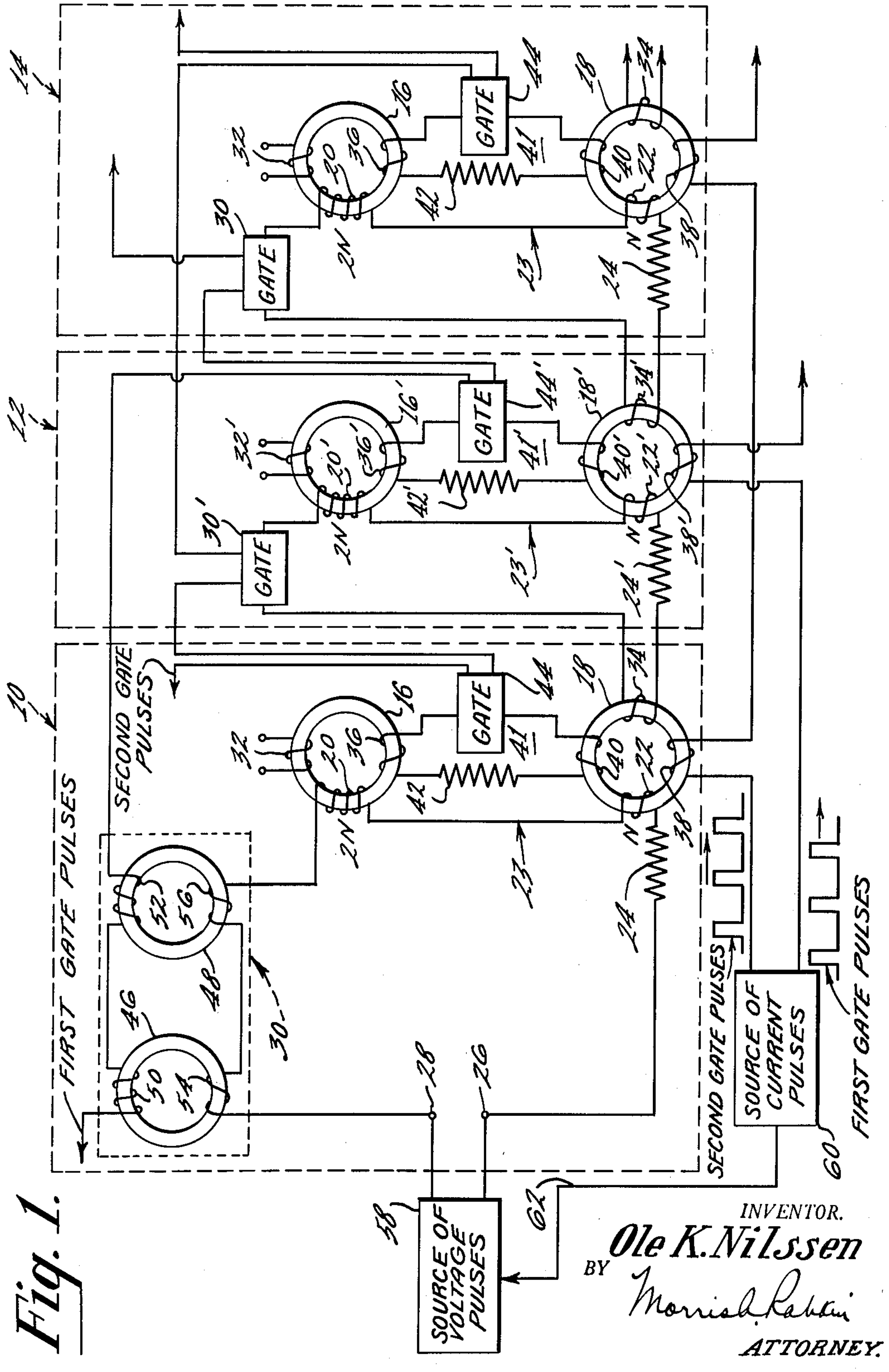
Figure 1 is a schematic circuit diagram of an embodiment of this invention.
Figure 2:
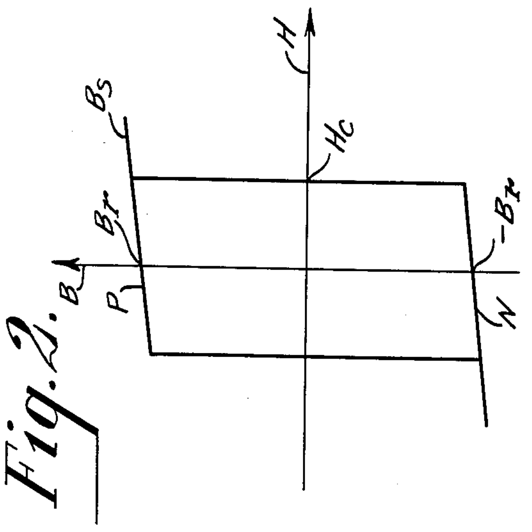
Figure 2 is an idealized graph of the hysteresis curve of magnetic materials used for the trigger circuit cores in Figure 1.

Figure 1, three stages 10, 12, 14 of a binary counter are shown. The stages 10, 12, 14 are substantially identical and, therefore, only the first stage 10 is described in detail. Two magnetic cores 16, 18 are provided that preferably are made of material having a substantial rectangular hysteresis curve of the type shown in Figure 2. Desirable characteristics of the core material are a high saturation flux density $B_s$, a high residual flux density $B_r$, and a low coercive force $H_c$. For the present, it is assumed that the cores 16, 18 have the same coercive force response; that is, a magnetizing force H at least equal to the threshold $H_c$ is required to drive a core from one remanent state to the other. Opposite magnetic states or directions of flux in the core are represented by P and N. The saturation flux density $B_s$ is substantially the same as the residual flux density $B_r$. Therefore, if a magnetizing force in the positive direction is applied to a core which is in the positive state P, essentially no change in the core flux density takes place. Ideally, if the magnetizing force in a flux reversing direction is less than the coercive force $H_c$, the flux density does not change below the knee of the curve, and the residual magnetism is substantially unchanged. In practice, the magnetic cores 16, 18 are sufficiently close to the ideal to have two remanent states of substantial stability.

Separate input windings 20, 22 are linked to the first and second cores 16, 18. For simplicity of illustration the input windings 20, 22 may be considered as having the same senses of linkage. The first core input winding 20 has a substantially larger number of turns than the second core input winding 22; for example, the input windings 20 and 22 may have 2N and N turns, respectively. The input windings 20, 22 are connected in a series circuit 23 with a resistor 24, a pair of input terminals 26, 28, and an input gate 30. Linked to the cores 16 and 18 are separate output windings 32 and 34 and separate restore windings 36 and 38, respectively. Also linked to the second core 18 is a transfer winding 40 which is connected in a series circuit 41 with the first core restore winding 36 through a resistor 42 and a transfer gate 44.

Figure 3:
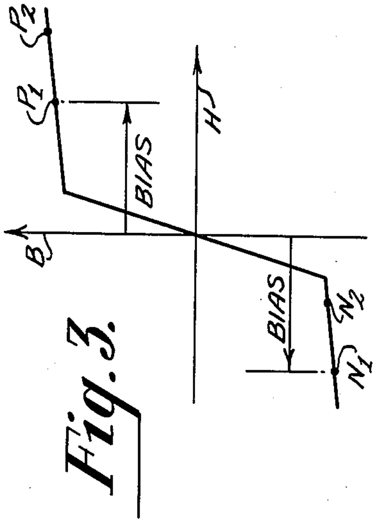
Figure 3 is an idealized graph of the hysteresis curve of magnetic materials used for the gate cores of Figure 1.

An appropriate form of input gate 30 may include two magnetic cores 46, 48 made of materials having a Z-shaped hysteresis curve as shown in idealized form in Figure 3. Separate control windings 50 and 52 are linked to the cores 46 and 48, respectively, and are connected in series opposition. Separate gated windings 54 and 56 are linked to the cores 46 and 48, respectively and are connected in series aiding fashion. The gated windings 54, 56 are connected in series with the input windings 20, 22 in the input series circuit 23. The transfer gate 44 may be constructed in the same manner as the input gate 30.

The third stage 14 of the counter is the same as the first stage 10 and the same numerals are used to reference corresponding parts. The second stage 12 is also the same as the first stage 10 and the same numerals with the addition of a prime (′) are used to reference corresponding parts. Connected to the input terminals 26, 28 of the first stage is a source 58 of voltage pulses. The voltage source 58 may be, for example, the output of another stage (not shown). Terminals of the second core output winding 34 of the first stage 10 are inputs of the second stage 12; the second core output winding 34 being connected in the series input circuit 23′ of the second stage 12. Similarly, the second core output winding 34′ of the second stage 12 is connected in the series input circuit 23 of the third stage 14. The second core restore windings 38 of the first 10, third 14, and succeeding odd stages (not shown) are connected in series to a source 60 of current pulses. The second core restore windings 38' of the second 12 and succeeding even stages (not shown) are also connected in series to the current pulse source 60. The current pulse source 60 may be any appropriate type for periodically producing two trains of current pulses that are alternately applied to the even and odd stage restore windings 38 and 38', respectively. The control windings 50, 52 of the even stage input gates 30 and the odd stage transfer gates 44' are connected in series with the even stage restore windings 38' to receive the same current pulses from the source 60. These current pulses are hereinafter called first gate pulses. The control windings 50, 52 of the odd stage transfer gates 44 and the even stage input gates 30' are connected in series with the odd stage restore windings 38 to receive the other current pulses which are called second gate pulses. The voltage pulse source 58 and the current pulse source 60 may be synchronized by any appropriate means (not shnown) so that the voltage pulses from the source 58 are applied to the first stage 10 at the same time that the first gate pulses are generated. This synchronization is indicated in Figure 1 by the connection 62 between the two sources 58, 60. The time between first and second gate pulses is arranged to be somewhat greater than the duration of these pulses.

The magnetizing force thresholds NI necessary to reverse the states of the first and second cores 16, 18 have been assumed to be the same. Therefore, if a current I in the N turns of the second core winding 22 is required to reverse the state of that core, a current $$\frac{I}{2}$$

in the winding 20 is sufficient to reverse the state of the first core 16. It is also assumed that the dimensions of the cores 16, 18 are the same. If A volt-microseconds are required to change the state of the first core 16, then $$\frac{A}{2}$$

volt-microseconds is required for the second core 18. An input pulse, for the sake of simplicity, may be considered to be a rectangular voltage wave of duration T, the volt-microseconds integral of which is B volt-microseconds per pulse. Then, for ideal operation, $$B=A+\frac{I}{2}RT$$

during the change of state of the first core 16, and $$B=\frac{A}{2}+IRT$$

during the change of state of the second core 18, where R is the resistance of the series circuit 23.

It is assumed that initially the first and second cores 16 and 18 are in state N. The operation of the first stage 10 alone is described first. In the absence of input pulses the first and second cores 16 and 18 remain in state N. The second gate pulses have a negligible effect on the second core 18 since they tend to drive that core 18 further to saturation in state N. The first gate pulses applied to the control windings 50, 52 of the input gate 30 drive the gate cores 46, 48 to opposite states of saturation, $P_1$ and $N_1$ respectively in Figure 3. The net voltage induced in the gated windings 54, 56 is zero, because they 54, 56 are connected in series aiding, and the control windings 50, 52 are connected in series opposition. Similarly, the net voltage induced in the series circuit 41 is zero upon the application of the second gate pulses to the transfer gate 44.

Figure 4:
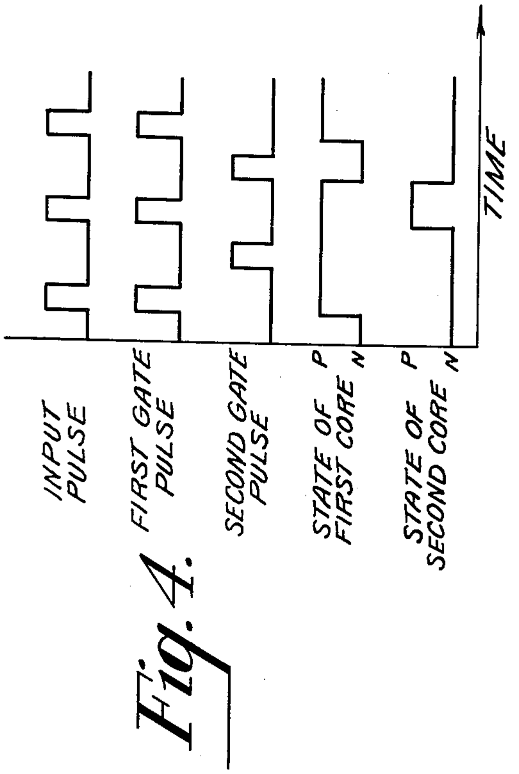
Figure 4 is an idealized graph of the time relationship of waveforms occurring in the circuit of Figure 1.

When the first input pulse is applied to the terminals 26, 28, the first gate pulse drives the gate cores 46, 48 to saturation $P_1$, $P_2$. The magnetizing force produced by the first gate pulses is made to be substantially greater than the magnetizing forces produced by currents in the input series circuit 23. With the maximum current in the series circuit 23, one of the cores 46, 48 is driven further into saturation at $P_2$, and the other to a somewhat less saturated condition $N_2$. Thus, the gated windings 54, 56 present a negligible impedance to the voltage pulses during the application of the first gate pulses. The first core 16 starts to change its state from N to P in response to a smaller magnetizing current than required by the second core 18. During the time that the first core 16 is changing from N to P and is traveling along the vertical portion of the hysteresis curve, the current in the series circuit 23 is limited to one-half that needed by the second core input winding 22 to turn over the second core 18. The duration T of the voltage pulse is such that the available volt-microseconds of the input pulse are used in changing the state of the first core 16, and the second core 18 remains substantially unaffected in state N. The next second gate pulse in the restore windings 38 does not affect the second core 18 since that core is in state N. Idealized waveforms showing the time relationships of the gate pulses and the operation of the first stage 10 are shown in Figure 4.

The next voltage pulse is gated through the input gate 30 by a first gate pulse and applied to the input windings 20, 22. The first core input winding 20 presents negligible impedance to the voltage pulse, because that core 16 is substantially saturated in state P. Therefore, the available voltage of the input pulse is applied across the second core input winding 22 and that core 22 is reversed to state P. During the time that the second core 18 is changing from state N to state P, no gate pulses are applied to the transfer gate 44 and the second stage input gate 30', and these gates 44 and 30' are left closed. The cores (not shown) of these gates 44, 30' are in the unsaturated condition and present large impedances to voltages induced in the second core output and transfer windings 34 and 40. As a result, there is a negligible effect on the first stage first core 16 and the second stage first core 16' due to these induced voltages. However, when the next second gate pulses are applied, the transfer gate 44 and the second stage input gate 30' are opened, and the second core 18 is restored to state N. The pulse induced in the transfer winding 40 is applied to the first core restore winding 36 to restore that core 16 to state N. Both cores 16 and 18 are then in the initial state N. At the same time, the pulse induced in the second core output winding 34 is applied to the second stage input series circuit 23' as an input to that stage 12.

The succeeding stages 12 and 14 operate in the same manner as described above. The first pulse received from the first stage output winding 34 changes the second stage first core 16' to state P, and the second such pulse changes the second core 18' to state P. After the second stage second core 18' is changed to state P, both cores 16' and 18' are restored to their initial states N, and a pulse is transferred to the third stage, and son on. Thus, for each two input pulses a pulse is transferred from one stage to the succeeding stage in the manner of a binary counter.

An alternative construction may include the cores 16 and 18 linked by input windings 20 and 22 having the same number of turns, but with a relatively large diameter core being used for the second core 18 and a small diameter core for the first core 16. As a result, a smaller magnetizing current is required to change the state of the smaller core.

It has been assumed for the purpose of the above description that the coercive forces $H_c$ of the cores 16 and 18 are the same and the number of winding turns or the core diameters are different. Alternatively, the number of winding turns may be the same, and cores may be employed that have different coercive forces, the first core coercive force being less than that of the second core 18.

Output pulses induced in the output windings 32 and

32′ of the stages may be employed to indicate the states of the different counter stages. Unilateral impedances (not shown) may be connected in circuit with the output windings 32, 32′ and poled so that the output pulses are derived only when the first cores 16, 16′ are restored to state N. The counter of Figure 1 may be employed where a periodically operated counter is desired, for example, for frequency dividing purposes.

The principles of this invention may be applied to a counter operating in accordance with any desired number radix. For example, in a radix three counter, each counter stage (not shown) may include three cores linked by input windings that have different numbers of turns, which, illustratively, may be 3N, 2N, and N turns, respectively. The gate pulses are applied to restore windings on the cores with N turns in the manner described above. Thus, when a count of three is registered in a stage, all three cores of that stage are restored to their initial stages, and a pulse is transferred to the succeeding stage as described above.

Figure 5:
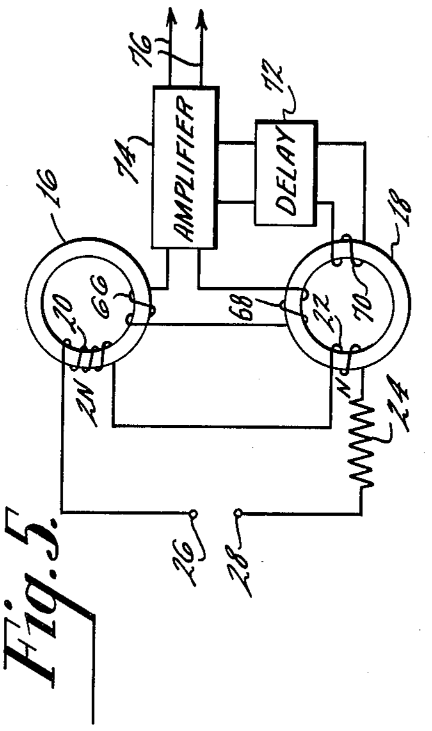
Figure 5 is a schematic circuit diagram of a modified embodiment of this invention.

In Figure 5, a bistable trigger circuit is shown that may be operated aperiodically. The same numerals are used to reference parts previously described. Separate restore windings 66, 68 are linked to the cores 16, 18 of a trigger circuit stage. An output winding 70 linked to the second core 18 is connected through a delay coupling circuit 72 to an amplifier 74. The amplifier 74 may be any appropriate type for supplying energizing currents to the restore windings 66 and 68 when it 74 receives a pulse from the output winding 70. The amplifier 74 may also have connections 76 for supplying a voltage pulse to a succeeding trigger circuit (not shown) at the same time. Such an amplifier 74 is exemplified by a grid-controlled electron tube (not shown) with the restore windings 66, 68 connected in the anode circuit, with a cathode load to supply the voltage output, and with the grid connected to receive the delayed voltage pulse from the output winding 70. The delay coupling circuit 72 may be of the type described in the article "Magnetic shift rgeister using one core per bit" by Kodis et al., in The Convention Record of the I. R. E., 1953, part 7, page 38.

Two successive input pulses applied to the terminals 26, 28 reverse the states of the cores 16 and 18 in that order. When the state of the second core 18 is reversed, a pulse is induced in the output winding 70, which pulse is transferred to the amplifier 74 upon termination of the associated input pulse. The amplifier 74 energizes the restore windings 66 and 68 to restore the cores 16 and 18 to their initial states, and, at the same time, an output voltage pulse is derived at the connections 76. Thus, the circuit of Figure 5 has two stable states and may be operated aperiodically. A circuit with any desired number of stable states may be provided by employing the same number of cores having input windings with different numbers of turns in the manner described above.

Thus, by means of this invention, an improved and simple magnetic device is provided that has a binary mode of operation. The magnetic device has two stable operating conditions and may be employed as a trigger circuit. A plurality of such devices may be connected in cascade to provide a binary counter.

What is claimed is:

1. A magnetic device comprising a plurality of magnetic elements each having two remanent states of substantial saturation, said elements being capable of changing from an initial one of said remanent states to the other in response to magnetizing forces at least equal to predetermined thresholds, winding means linked to said elements, means for applying voltage pulses to said winding means, said magnetizing force thresholds and the number of turns in said winding means being such that the energizing current in said winding means of one of said elements necessary to produce said magnetizing force thresholds for said one element is smaller than the energizing current in said winding means of another of said elements necessary to produce said magnetizing force threshold for said another element, and means for applying magnetizing forces to said elements to restore them to said intial states when said other element is changed to said other state.

2. A magnetic device as recited in claim 1 wherein said magnetizing force thresholds of said elements are substantially equal, and said winding means includes separate windings linked to said one and said another elements, said one element winding having a larger number of turns than said other element winding.

3. A magnetic device as recited in claim 1 wherein said winding means has the same number of turns linking said elements, and said magnetizing force thresholds of said one element are smaller than said magnetizing force threshold of said other element.

4. A magnetic device comprising a plurality of magnetic elements each having two remanent states of substantial saturation, said elements being capable of changing from an initial one of said remanent states to the other in response to magnetizing forces at least equal to predetermined thresholds, winding means linked to said elements, means for applying voltage pulses to said winding means, said magnetizing force thresholds and the number of turns in said winding means being such that smaller and larger magnetizing currents in said winding means are necessary to produce said magnetizing force thresholds for one and another of said elements repectively, and means for applying magnetizing forces to said elements to restore them to said initial states after said other element is changed to said other state.

5. A magnetic device as recited in claim 4 wherein said means for applying magnetizing forces to said elements to restore them to said initial states includes additional winding means linked to said elements.

6. A magnetic device as recited in claim 5 wherein said additional winding means includes separate windings connected in series, and said means for applying magnetizing forces to said elements to restore them to said initial states further includes means for applying energizing currents to said windings.

7. A magnetic device as recited in claim 6 wherein said means for applying magnetizing forces to said elements to restore them to said initial states includes variable impedance means connected in series with said separate windings.

8. A magnetic device as recited in claim 4 wherein said means for applying voltage pulses to said winding means includes variable impedance means connected in series with said voltage pulse winding means.

9. A magnetic device comprising a plurality of magnetic elements each having two remanent states of substantial saturation, said elements being capable of changing from one of said remanent states to the other in response to magnetizing forces at least equal to predetermined thresholds, separate windings linked to said elements, means for applying voltage pulses across said windings in series, said magnetizing force thresholds and the number of turns in said windings being such that smaller and larger magnetizing currents in said windings are necessary to produce said magnetizing force thresholds for one and another of said elements respectively, and means responsive to a change of state of said other element for applying a magnetizing force of threshold magnitude to said one element.

10. A magnetic device having a binary mode of operation comprising a plurality of magnetic elements each having two magnetic states, said elements being capable of changing from an initial one of said states to the other in response to predetermined magnetizing forces, winding means linked to said elements, means for applying voltage pulses to said winding means to change said elements to said other states, said predetermined magnetizing forces and the number of turns in said winding means being such that smaller and larger magnetizing currents in said winding means are required to produce said predetermined magnetizing forces for one and another of said elements respectively, and means for applying magnetizing forces to said elements to restore them to said initial states upon said other element being changed to said other state.

11. A magnetic device as recited in claim 10 wherein said means for applying magnetizing forces to said elements to restore them to said initial states is responsive to said other element being changed to said other state.

12. A magnetic device as recited in claim 10 wherein said means for applying magnetizing forces to said elements to restore them to said initial states includes separate additional windings linked to said elements, and means for applying energizing currents to said elements in response to said other element being changed to said other state.

13. Apparatus comprising a plurality of magnetic devices, each of said devices including a plurality of magnetic elements each having two magnetic states, said elements being capable of changing from an initial one of said states to the other in response to predetermined magnetizing forces, separate input windings linked to said elements and connected in series, said predetermined magnetizing forces and the number of turns in said winding means being such that smaller and larger magnetizing currents in said windings are required to produce said predetermined magnetizing forces for one and another of said elements respectively, an output winding linked to one of said elements, and means for applying magnetizing forces to said elements to restore them to said initial states upon said other element being changed to said other state, said apparatus further comprising means coupling said output winding of a first one of said devices to said input windings of a second one of said devices.

14. Apparatus as recited in claim 13 wherein said means coupling said first device output winding to said second device input windings includes gate means connected in a series circuit with said first device output winding and said second device input windings, and wherein said means for applying magnetizing forces to said first device elements to restore them to said initial states includes a restore winding linked to said second element, means for applying energizing currents to said restore winding, separate additional windings linked to said first device elements, gate means connected in a series circuit with said additional windings, and means for opening both said gate means in synchronism with the application of said energizing currents to said restore winding.

No references cited.